S. MADJAR.
AUTOMOBILE WHEEL.
APPLICATION FILED NOV. 24, 1920.

1,387,793.

Patented Aug. 16, 1921.
2 SHEETS—SHEET 1.

Inventor
S. Madjar
By J. K. Bryant
Attorney

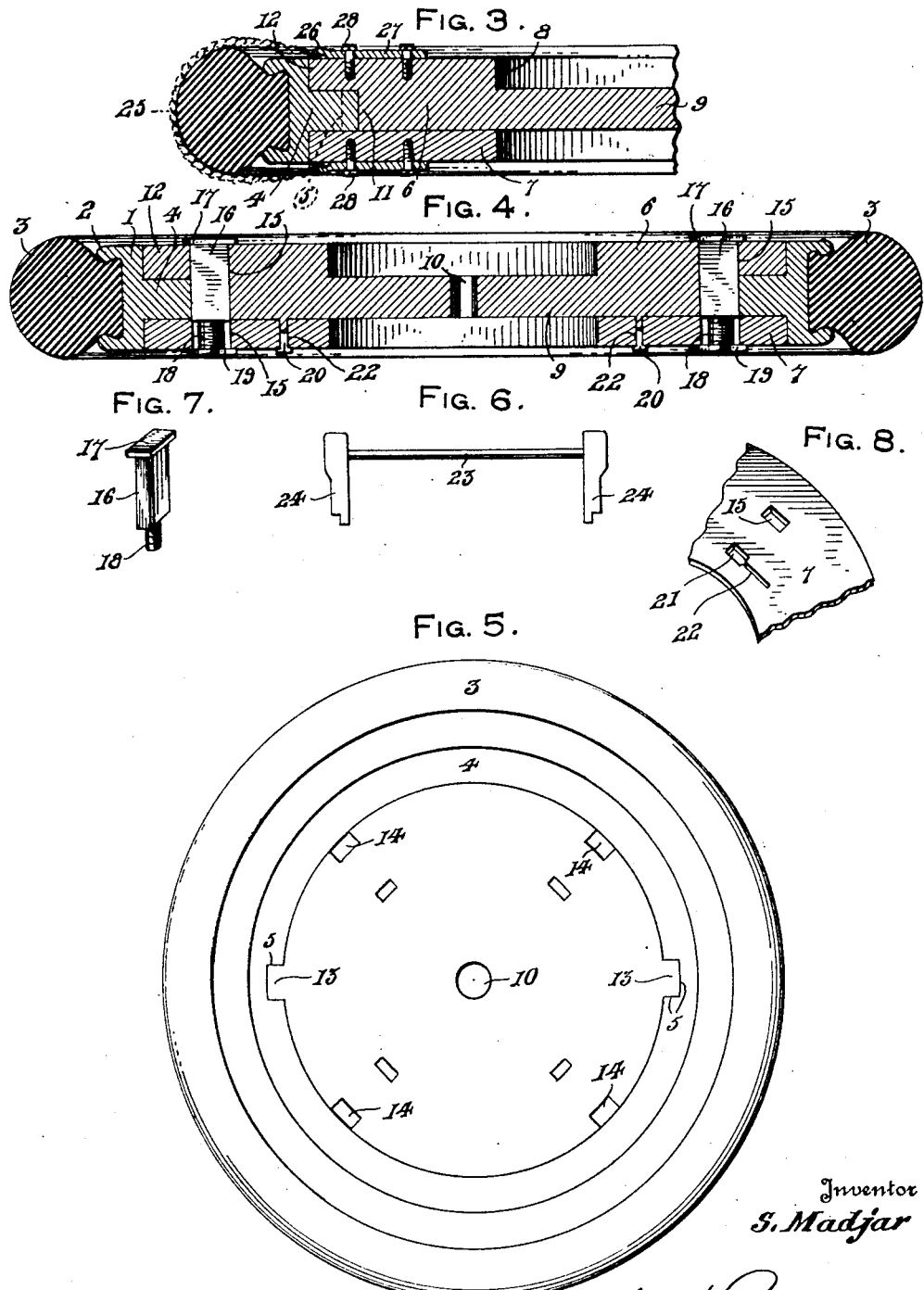

UNITED STATES PATENT OFFICE.

STEPAN MADJAR, OF OGDENSBURG, NEW JERSEY.

AUTOMOBILE-WHEEL.

1,387,793.  Specification of Letters Patent.  Patented Aug. 16, 1921.

Application filed November 24, 1920. Serial No. 426,180.

*To all whom it may concern:*

Be it known that I, STEPAN MADJAR, a citizen of Jugoslavia, residing at Ogdensburg, in the county of Sussex and State of New Jersey, have invented certain new and useful Improvements in Automobile-Wheels, of which the following is a specification.

This invention relates to certain new and useful improvements in automobile wheels and has for one of its objects to provide a wheel having a disk web portion between the hub and rim thereof in lieu of the ordinary spoke construction.

A further object of the invention resides in the provision of an automobile wheel wherein disk web portions coöperate with an annular rim to hold the same properly positioned with a cushion tire supported on the rim.

A still further object of the invention is to provide an automobile wheel embodying connected disk web portions supporting a wheel rim having a cushion tire thereon and an anti-skid chain inclosing the tire tread and secured thereon by clamping plates carried by the outsides of the disk webs.

With the above and other objects in view, the present invention consists in the novel form, combination and arrangement of parts hereiafter more fully described in connection with the accompanying drawings, and in which like reference characters indicate corresponding parts throughout the several views.

Figure 1:
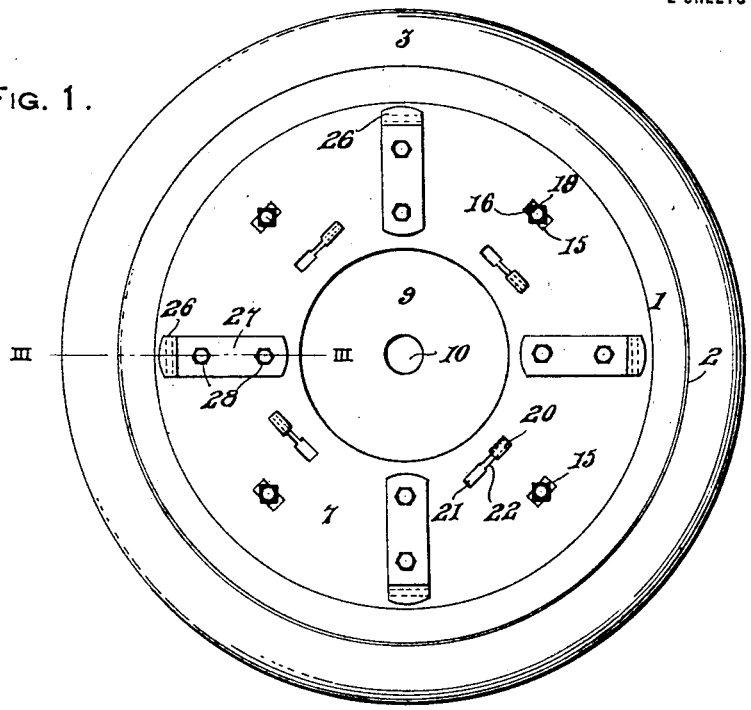
Figure 1 is a side elevational view of an automobile wheel constructed in accordance with the present invention.
Figure 2:
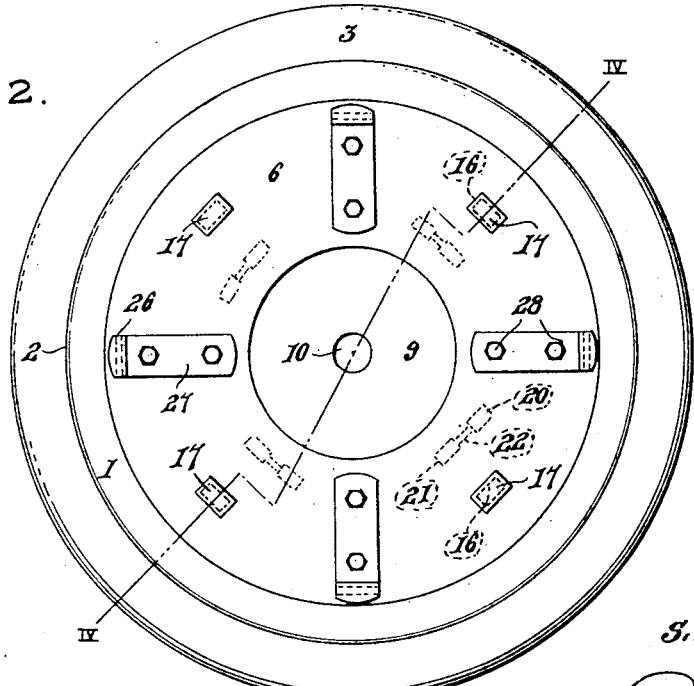
Fig. 2 is a side elevational view of the reverse side of the wheel.

Fig. 3 is a cross sectional view taken on line III—III of Fig. 1 showing the anti-skid chain attached to the side disks of the wheel, Fig. 4 is a cross sectional view taken on line IV—IV of Fig. 2 showing the connecting bolts for securing the disk webs assembled and the pin and slot connection between the disk webs, Fig. 5 is a side elevational view of the wheel with one of the disk webs removed, Fig. 6 is a side elevational view of a spanner wrench employed for rotating one of the disk webs into locking engagement with the other disk web, Fig. 7 is a perspective view of one of the connecting bolts between the disk webs, and Fig. 8 is a fragmentary perspective view of the shiftable disk web.

Referring more in detail to the accompanying drawings, there is illustrated an automobile wheel comprising a rim 1 having side flanges 2 for retaining thereon a cushion tire 3. the inner face of the rim 1 carrying a relatively short inwardly directed flange 4 having diametrically opposite notches 5 formed therein as clearly shown in Figs. 3 and 5.

A pair of disk webs are provided for supporting the rim section 1, the same being designated by the reference numerals 6 and 7. The disk web 6 is centrally cut away on its outer face as at 8 to provide a reduced central section 9 having an axle mounting 10 formed therein.

The periphery of the section 6 has a shoulder 11 formed at the inner edge thereof to define an outer edge flange 12 shown more clearly in Figs. 3 and 4. The outer face of the shoulder 11 carries diametrically opposite lugs 13 for reception in the notches 5 of the rim flange 4 to lock the disk web 6 to the rim 1 and prevent relative rotation thereof.

The disk web 7 is in the form of a disk ring having the inner wall thereof alined with the cut away portion 8 of the web 6 while the inner face of the web 7 abuts the inner face of the web 6 with the outer edge thereof engaging the side of the rim flange 4 opposite the web flange 12, thus confining the rim 1 between the disk webs 6 and 7.

A locking connection between the disk webs 6 and 7 embodies the provision of openings 14 extending transversely through the disk web 6 and openings 15 in the disk web 7. the openings being rectangular in form to provide the non-rotative reception of the screw bolts 16 having heads 17 engaging the outer faces of the disk webs 6, the other end of the bolt 16 being provided with a screw extension 18 upon which a nut 19 is mounted for engaging the adjacent face of the disk web 7. The inner face of the web 6 carries headed pins 20 projecting perpendicularly therefrom and adapted for reception in the enlarged ends 21 of the arcuate slots 22. Previously to positioning the connecting bolts 16, the disk web 7 is placed upon the disk web 6 with the enlarged openings 22 of the slots in registration with the headed pins 20 through which openings 21 the head pins freely project, and by partially rotating the web 7 the headed pins 20 are moved into the narrow slots 22 with the heads of said pins overlying the walls of said slots to retain the disk webs assembled.

During rotation of the web 7, the openings 14 and 15 are brought into registration for reception of the locking bolts 16, there being provided a double connection between the disk webs 6 and 7 in the form of the connecting bolts 16 and the pin and slot connections 20 and 22. To effect rotation of the disk web 7, the spanner wrench shown in Fig. 6 is employed the same including a handle 23 having end keys 24 for reception in the web openings 15 for rotating the same.

A form of anti-skid chain as shown in Fig. 3 is associated with the tire 3, the same embodying a chain member 25 having the ends thereof secured beneath the lipped ends 26 of the clamping plates 27, the plates being secured to the outer faces of the disk webs 6 and 7 by fastening screw 28. As shown in Figs. 1 and 2, preferably four attaching plates 27 are carried by each disk 6 and 7 for securing the skid chains 25 in position although it is not so intended to limit this invention.

The lug connection 13 between the disk web 6 and the flange 4 of the rim 1 prevents rotation of the rim upon the disk webs while the locking connections between the disk webs 6 and 7 hold the same relatively immovable with the flange of the rim clamped between the disk webs. The separate connecting devices between the disk webs 6 and 7 coöperate with each other in that the connecting bolts 16 retain the pin and slot connection 20 and 22 between the disk webs properly positioned.

While there is herein shown and described the preferred embodiment of the invention, it is nevertheless to be understood that minor changes may be made in the novel form, combination and arrangement of parts without departing from the spirit and scope of the invention as claimed.

What is claimed as new is:

1. A vehicle wheel of the type described comprising a pair of disk web sections, transverse bolts for securing the web sections against relative movement, a rim section having a relatively short inwardly directed flange clamped between said web sections and a tire mounted on said rim section.

2. A vehicle wheel of the type described, comprising a rim section having a relatively short inwardly projecting flange section with diametrically opposite notches disposed therein, an inner and an outer web disk section, a shoulder upon the periphery of the outer web disk section carrying diametrically opposite lug members for engagement with the opposite notches within the flange of the rim, and transverse bolt members for clamping the disk sections upon the flange of the rim.

In testimony whereof I affix my signature.

STEPAN MADJAR.